(12) United States Patent
Jeong et al.

(10) Patent No.: US 12,098,811 B2
(45) Date of Patent: Sep. 24, 2024

(54) SOLAR-POWERED LIGHTING ASSEMBLIES

(71) Applicant: MPOWERD, Inc., Brooklyn, NY (US)

(72) Inventors: Seungah Jeong, New York, NY (US);
John Salzinger, Brooklyn, NY (US);
Juan S. Jacobo, Brooklyn, NY (US);
Scott Klimcke, Brookllyn, NY (US)

(73) Assignee: MPOWERD INC., Brooklyn, NY (US)

( * ) Notice: Subject to any disclaimer, the term of this patent is extended or adjusted under 35 U.S.C. 154(b) by 0 days.

(21) Appl. No.: 18/202,572

(22) Filed: May 26, 2023

(65) Prior Publication Data
US 2023/0383915 A1 Nov. 30, 2023

Related U.S. Application Data

(60) Provisional application No. 63/346,685, filed on May 27, 2022.

(51) Int. Cl.
| | |
|---|---|
| *F21L 4/08* | (2006.01) |
| *F21V 17/06* | (2006.01) |
| *F21V 21/08* | (2006.01) |
| *F21Y 115/10* | (2016.01) |
| *H02J 7/35* | (2006.01) |
| *H02J 50/00* | (2016.01) |

(52) U.S. Cl.
CPC ............... *F21L 4/08* (2013.01); *F21V 17/06* (2013.01); *F21V 21/0832* (2013.01); *H02J 7/35* (2013.01); *H02J 50/005* (2020.01); *F21Y 2115/10* (2016.08)

(58) Field of Classification Search
CPC ............ F21L 4/00–08; F21V 17/00–20; F21V 21/08–0832; H02J 7/35; H02J 50/00–005
See application file for complete search history.

(56) References Cited

U.S. PATENT DOCUMENTS

| | | | | |
|---|---|---|---|---|
| 6,135,623 | A * | 10/2000 | Lin | ........................ F21V 17/14 |
| | | | | 362/431 |
| 9,197,033 | B1 * | 11/2015 | Tsai | ...................... H01S 5/4093 |
| 9,388,953 | B2 * | 7/2016 | Workman | ............... F21L 13/06 |
| 2008/0037243 | A1 * | 2/2008 | Discoe | .................... F21S 9/026 |
| | | | | 362/183 |

* cited by examiner

*Primary Examiner* — Jason M Han
(74) *Attorney, Agent, or Firm* — PEARL COHEN ZEDEK LATZER BARATZ LLP

(57) ABSTRACT

A portable solar-powered lighting assembly that includes a lighting device including a light source, a rechargeable battery, and a first engagement interface. The light source is electrically connected to the rechargeable battery. The assembly includes a fastening device including a distal tip, a fastening element, and a second engagement interface. The fastening device is configured to selectively couple with the lighting device in response to the second engagement interface mating with the first engagement interface. The fastening device is configured to secure the lighting device to a surface in response to the fastening device penetrating the surface via the distal tip, and secure the lighting device to a tool in response to the fastening device receiving the tool through the fastening element.

18 Claims, 5 Drawing Sheets

SOLAR-POWERED LIGHTING ASSEMBLIES

CROSS REFERENCE TO RELATED APPLICATION

This application claims the benefit of U.S. Provisional Patent Application No. 63/346,685, filed May 27, 2022, which is incorporated by reference.

TECHNICAL FIELD

The present invention relates to portable solar-powered lighting. More particularly, the present invention relates to a portable solar-powered lighting assembly that is selectively attachable to a fastening device for a variety of uses.

BACKGROUND

Portable and wireless lights have uses in a variety of situations, including during travel and in situations with no power access. Examples include cases of natural disaster and other emergencies, remote or rural locations far from a conventional power outlet or electricity grid, developing countries that have limited and/or unreliable power, or even camping. Yet, current lighting options are often short-lived, non-reuseable or non-rechargeable, and/or impractical for use in multiple different settings and/or physical environments. Further, a capability to position or secure such lighting devices to a surrounding environment for use in the multiple different settings may be limited.

SUMMARY

The present disclosure includes portable solar-powered lighting assemblies capable of being assembled in a variety of configurations for different uses. The solar-powered lighting assemblies herein may be useful in situations of intermittent access to electricity as a more stable and/or consistent source of power. The solar-powered lighting assembly herein also may be more economical and/or portable than traditional lighting devices. The solar-powered lighting assemblies may include lighting devices that may be assembled to fastening devices to facilitate coupling the lighting device to various different surfaces and/or objects to increase the environmental settings in which the lighting device may be used.

According to at least one example, a portable solar-powered lighting assembly includes a lighting device including a light source, a rechargeable battery, and a first engagement interface, the light source is electrically connected to the rechargeable battery; and a fastening device including a distal tip, a fastening element, and a second engagement interface, the fastening device is configured to selectively couple with the lighting device in response to the second engagement interface mating with the first engagement interface; wherein the fastening device is configured to secure the lighting device to a surface in response to the fastening device penetrating the surface via the distal tip, and the fastening device is configured to secure the lighting device to a tool in response to the fastening device receiving the tool through the fastening element.

Any of the solar-powered lighting assemblies described herein may include any of the following features. The first engagement interface includes a first magnet, and the second engagement interface includes a second magnet that is configured to mate with the first magnet. The first engagement interface includes a threaded opening, and the second engagement interface includes a threaded shaft that is configured to mate with the threaded opening. The lighting device includes a handle and a housing, and the light source includes one or more light-emitting diodes (LEDs) disposed within the housing. The housing is at least partially transparent such that the one or more LEDs disposed within the housing are configured to emit light from the lighting device through the housing. The handle includes at least one actuator configured to actuate the lighting device to emit light from the light source using current stored in the rechargeable battery. The lighting device includes a universal serial bus (USB) connector that is configured to couple an external electronic device to the rechargeable battery to transfer power from the rechargeable battery to the external electronic device using current generated stored in the rechargeable battery. The fastening element includes an enclosed aperture formed on the fastening device, and the tool includes a cord extending through the enclosed aperture. The fastening device is configured to secure the lighting device to the cord in response to the fastening device receiving the cord through the enclosed aperture, such that the lighting device is suspended on the cord. The fastening device includes a second fastening element defining a hook formed on the fastening device, the fastening device is configured to secure the lighting device to the tool in response to the fastening device receiving the tool through the second fastening element. The lighting device includes at least one fastening element, the lighting device is configured to couple the tool in response to the lighting device receiving the tool through the at least one fastening element of the lighting device. The assembly further including a charging case that is configured to receive the lighting device and the fastening device, the charging case including: a rechargeable battery; and a solar panel positioned along an exterior of the charging case, the solar panel being electrically connected to the rechargeable battery and configured to generate electrical power for storing in the rechargeable battery. The charging case includes a plurality of first slots configured to receive a plurality of lighting devices, and a plurality of second slots configured to receive a plurality of fastening devices. Each of the plurality of first slots includes a third engagement interface that is configured to mate with the first engagement interface, thereby coupling the plurality of lighting devices to the plurality of first slots. The first engagement interface includes a first magnet, and the third engagement interface includes a second magnet that is configured to mate with the first magnet. The charging case is configured to transfer the electrical power generated by the solar panel and stored in the rechargeable battery to the plurality of lighting devices in the plurality of first slots.

According to another example, a portable solar-powered lighting assembly includes a lighting device including: a light source; a rechargeable battery electrically connected to the light source; a first fastening element configured to receive a tool; and a first engagement interface; and a fastening device including: a distal tip configured to insert the fastening device into a surface; a second fastening element configured to receive the tool; and a second engagement interface configured to mate with the first engagement interface to selectively couple the fastening device with the lighting device; wherein, with the lighting device coupled to the fastening device, the lighting device is configured to secure the fastening device to the tool in response to the first fastening element receiving the tool, and the fastening device is configured to secure the lighting device to the surface in response to the distal tip penetrating the surface, and to the tool in response to the second fastening element receiving the tool.

Any of the solar-powered lighting assemblies described herein may include any of the following features. The assembly further including a charging case configured to receive the lighting device and the fastening device, the charging case including: a rechargeable battery; and a solar panel positioned along an exterior of the charging case, the solar panel being electrically connected to the rechargeable battery and configured to generate electrical power for storing in the rechargeable battery. The charging case is configured to charge the lighting device with the electrical power generated by the solar panel and stored in the rechargeable battery.

According to another example, a portable solar-powered lighting assembly includes a plurality of lighting devices, each of the plurality of lighting devices including a light source, a rechargeable battery, and a first engagement interface, the light source is electrically connected to the rechargeable battery; a plurality of fastening devices including a second engagement interface, each of the plurality of fastening devices is configured to selectively couple with at least one of the plurality of lighting devices in response to the second engagement interface mating with the first engagement interface; and a case including a plurality of first slots configured to receive the plurality of lighting devices, and a plurality of second slots configured to receive the plurality of fastening devices, each of the plurality of first slots includes a third engagement interface that is configured to mate with the first engagement interface, thereby coupling the plurality of lighting devices to the plurality of first slots; wherein the case is configured to charge the plurality of lighting devices received within the plurality of first slots with solar power generated from a solar panel of the case.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The terminology used in this disclosure may be interpreted in its broadest reasonable manner, even though it is being used in conjunction with a detailed description of certain specific examples of the present disclosure. Both the foregoing general description and the following detailed description are exemplary and explanatory only and are not restrictive of the features, as claimed.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. The terms "comprises," "comprising," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. The term "exemplary" is used in the sense of "example" rather than "ideal."

The present disclosure includes solar-powered lighting assemblies that are portable and adapted to assume different configurations for varying uses (e.g., modular). For example, the solar-powered lighting assemblies herein may include multiple components capable of assembly for use in different types of environments or settings.

Figure 1:
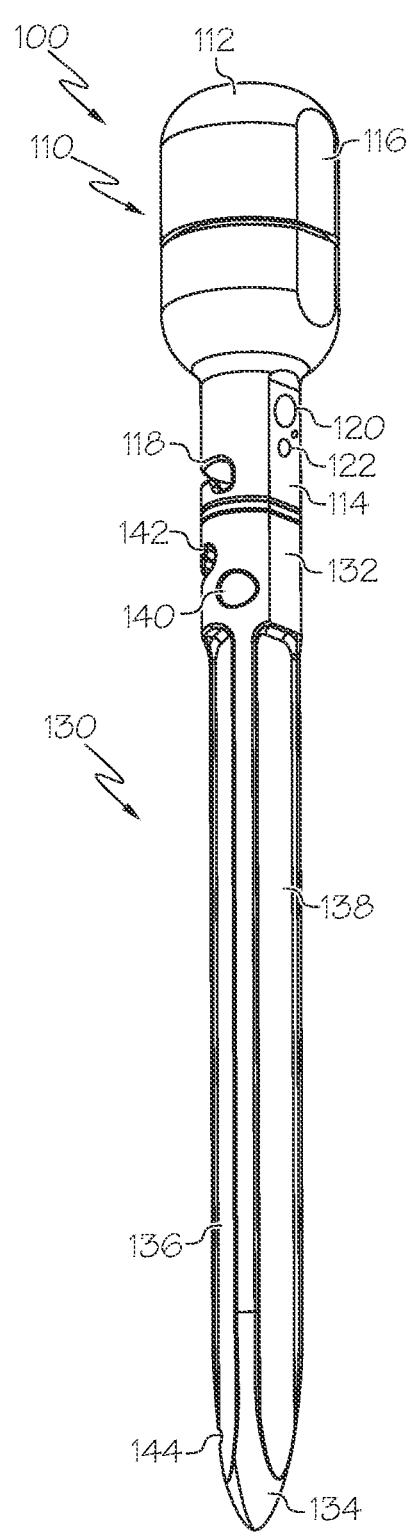
FIG. 1 shows a perspective view of an exemplary portable solar-powered lighting assembly, in accordance with some aspects of the present disclosure.

FIG. 1 shows aspects of an exemplary solar-powered lighting assembly 100 in accordance with the present disclosure. The solar-powered lighting assembly 100 may include a plurality of components or mechanisms that may facilitate use or charging in a variety of configurations. The solar-powered lighting assembly 100 may include a lighting device 110 and a fastening device 130. The lighting device 110 may include a housing 112, a handle 114, and a planar interface 116. The housing 112 may be located at a top end of the lighting device 110, and the handle 114 may be located at a bottom end of the lighting device 110 that is opposite of the housing 112 at the top end. The housing 112 may be at least partially transparent and/or translucent to allow for a light generated from within the lighting device 110 to be emitted through housing 112. In some examples, at least a portion of the housing 112 may be reflective or otherwise include one or more reflective surfaces to promote diffusion of the light emitted by the lighting device 110.

The lighting device 110 may also include one or more actuators 120, such as along the handle 114. The one or more actuators 120 may include a depressible button, a touchscreen display, a switch, a dial, and/or various other suitable input interfaces. In the example, the actuator 120 may include a power button that is operable to transfer electrical power stored in a rechargeable battery of the lighting device 110 (see FIG. 6) to other electrical components of the lighting device 110, such as a light-emitting diode (LED). In the example, the lighting device 110 may include one actuator 120 that may be selectively actuated by a user to power the lighting device 110.

Additionally, the actuator 120 may be selectively actuated to change between different operating modes of the lighting device 110, and/or to check the amount of power or charge remaining in the rechargeable battery of the lighting device 110. For example, the actuator 120 may be actuated to switch between various modes, such as varying levels of intensity or brightness, initiating an on/off flashing or other pattern, and/or different colors. In order to selectively change between the different operating modes, a user may actuate the actuator 120 by manually depressing the actuator 120 multiple times, holding the actuator 120 for a predefined duration, etc. It should be appreciated that various other combinations of actuating the actuator 120 may be employed to selectively switch between the different operating modes of the lighting device 110.

Still referring to FIG. 1, the lighting device 110 may include an interface display 122, such as along the handle 114. The interface display 122 may be configured to display a current operating mode of the lighting device 110 and/or a current amount of power or charge remaining in the rechargeable battery of the lighting device 110 (see FIG. 6). In the example, the interface display 122 may include one or more LEDs that may be configured to illuminate and/or display different colors based on an operating mode or power level of the lighting device 110. In other examples, the interface display 122 may include a display screen (e.g., a LCD screen) and/or other suitable display devices.

The lighting device 110 may include at least one planar interface 116 positioned along at least a portion of the housing 112. The planar interface 116 may define a flattened portion of the housing 112 relative to a generally rounded cross-sectional profile of the housing 112. The planar interface 116 may be positioned along a portion of the circumference of the housing 112. As described in detail herein, the planar interface 116 may be sized, shaped, and/or otherwise configured to facilitate coupling the lighting device 110 to one or more other components of the solar-powered lighting assembly 100, such as a charging case 150 (see FIGS. 7-8). In some embodiments, the lighting device 110 may be formed of a material that is water-resistant and/or waterproof, such as, for example, acrylonitrile butadiene styrene (ABS), polypropylene, polyethylene, silicone, polyurethane, including thermoplastic polyurethane (TPU), polyvinylchloride (PVC), or a combination thereof.

Still referring to FIG. 1, the fastening device 130 may include a proximal end 132 and a distal tip 134 that is positioned opposite of the proximal end 132. The fastening device 130 may have a longitudinal length defined between the proximal end 132 and the distal tip 134. The fastening device 130 may include a device and/or mechanism configured to fasten, attach, mount, and/or otherwise couple the lighting device 110 to one or more surfaces and/or objects. In the example, the fastening device 130 may include a stake and/or a post that is sized, shaped, and/or otherwise configured to be manually inserted into a surface, such as a ground. In one example, the fastening device 130 may have a longitudinal length ranging from about 1 inch to about 12 inches, such as 6 inches. The fastening device 130 may be formed of a durable material capable of withstanding an application of force thereto, such as a plastic, a metal, etc.

Figure 2:
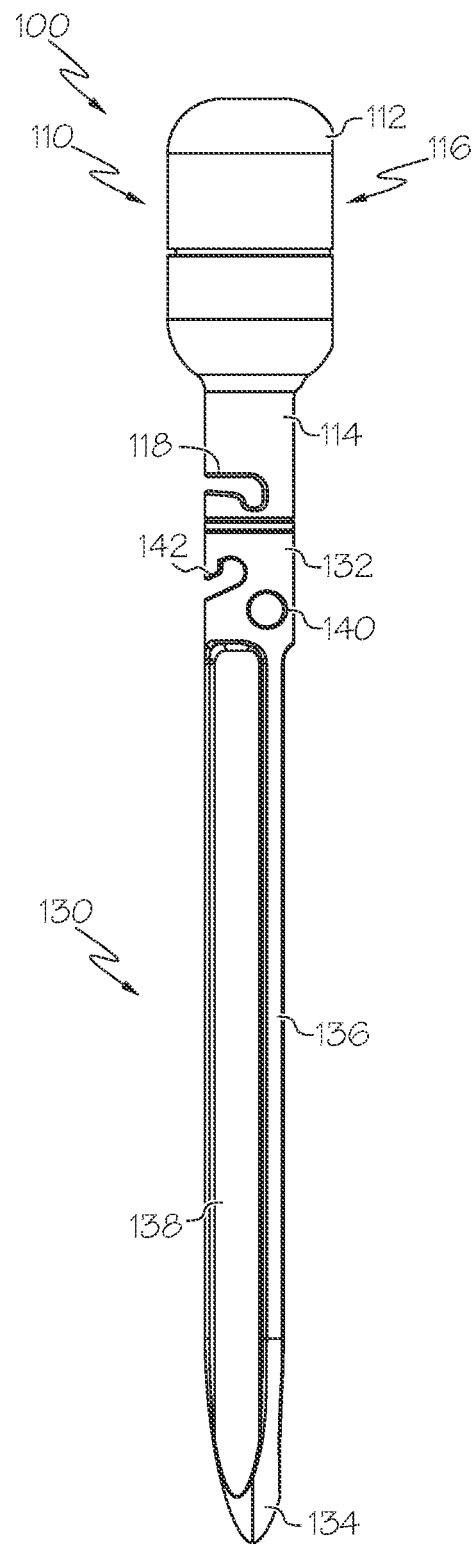
FIG. 2 shows a side view of the portable solar-powered lighting assembly of FIG. 1, in accordance with some aspects of the present disclosure.

The fastening device 130 may be configured to selectively attach to the lighting device 110, such as at the proximal end 132, for coupling the lighting device 110 and the fastening device 130 together for use in an assembled state as shown in FIGS. 1-2. As described herein, the proximal end 132 may include an engagement interface 131 (see FIG. 5) configured to facilitate connection between the lighting device 110 and the fastening device 130. The distal tip 134 may define an attachment interface for securing the fastening device 130 to one or more surfaces and/or objects.

In the example, the distal tip 134 may have a tapered configuration to facilitate insertion of the fastening device 130 into the one or more surfaces and/or objects. For example, the distal tip 134 may be generally curved, pointed, or otherwise have a cross-sectional profile capable of piercing through ancillary surfaces and objects. In the example, the distal tip 134 may be curved and/or pointed, thereby defining a sharp tip at the distal tip 134 which may facilitate inserting (e.g., penetrating) the fastening device into a surface, such as a ground, by pushing the fastening device 130 into the ground. With the lighting device 110 coupled to the fastening device 130, the fastening device 130 may be configured to couple the lighting device 110 to the ground.

The fastening device 130 may include one or more ridges 136 and one or more recessed surface 138 positioned along a longitudinal length of the fastening device 130. The one or more recessed surfaces 138 may define a relatively flat surface relative to the one or more ridges 136 that protrude laterally outward from the fastening device 130. The one or more ridges 136 and recessed surfaces 138 may generally extend between the proximal end 132 and the distal tip 134. In the example, each of the one or more ridges 136 may be separated from one another by at least one of the one or more recessed surfaces 138 positioned therebetween.

Still referring to FIG. 1, the ridges 136 and the recessed surfaces 138 may cooperatively facilitate an attachment of the fastening device 130 to a surface and/or object. For example, the ridges 136 and/or the recessed surfaces 138 may be sized, shaped, and/or otherwise configured to minimize a force required to insert (e.g., push) the fastening device 130 when attaching the fastening device 130 to the surface and/or object. Stated differently, a length, a width, a height, and/or a surface area of the ridges 136 and the recessed surfaces 138 may enhance a traction of the fastening device 130, increase a holding power of the fastening device 130, and/or increase a strength or durability of the fastening device 130 against deformation (e.g., bending) when in use. In some embodiments, the one or more recessed surface 138 may be used in conjunction with the planar interface 116 to facilitate an orientation and connection between the lighting device 110 and the fastening device 130 during assembly.

As best seen in FIG. 2, each of the lighting device 110 and the fastening device 130 may include one or more fastening elements. For example, the lighting device 110 may include a fastening element 118 positioned along the handle 114. The fastening device 130 may include a first fastening element 140 and a second fastening element 142 positioned along the proximal end 132, and a third fastening element 144 positioned adjacent to the distal tip 134 (see FIG. 5). Each of the fastening elements may include an opening that is sized, shaped, and/or otherwise configured to receive a tool (e.g., a cord, a wire, a cable, a rope, a shaft, etc.) therethrough for coupling the respective component of the solar-powered lighting assembly 100 (e.g., the lighting device 110, the fastening device 130) to the tool.

For example, the fastening elements may include, but are not limited to, a through-hole, a stepped-hole, a threaded hole, a channel, a recess, a cavity, a slot, a hook, a loop, an interface including an adhesive, or various other suitable interfaces for receiving a tool. In the example, each of the first fastening element 140 and the third fastening element 144 may include an enclosed hole or opening having a substantially circular cross-sectional profile. The fastening element 118 and the second fastening element 142 may include an open slot or channel defining a hook for engaging the tool. As described herein, each of the lighting device 110 and the fastening device 130 may receive and engage a tool within the respective fastening elements 140 for securing (e.g., hanging, suspending) the solar-powered lighting assembly 100 to one or more surfaces and/or objects via the tool received therein.

Figure 3:
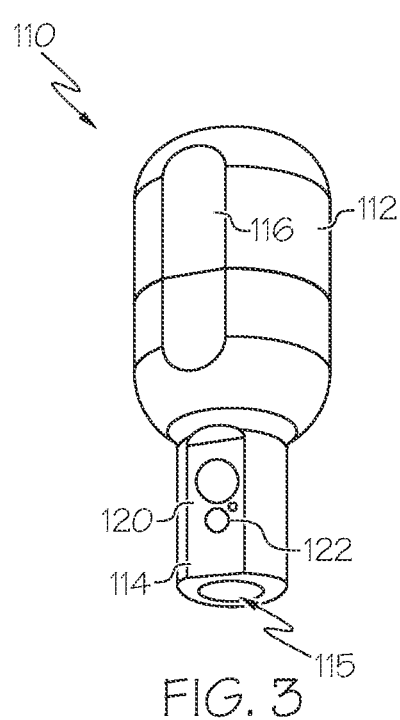
FIG. 3 show a perspective view of a lighting device of the portable solar-powered lighting assembly of FIG. 1, in accordance with some aspects of the present disclosure.
Figure 7:
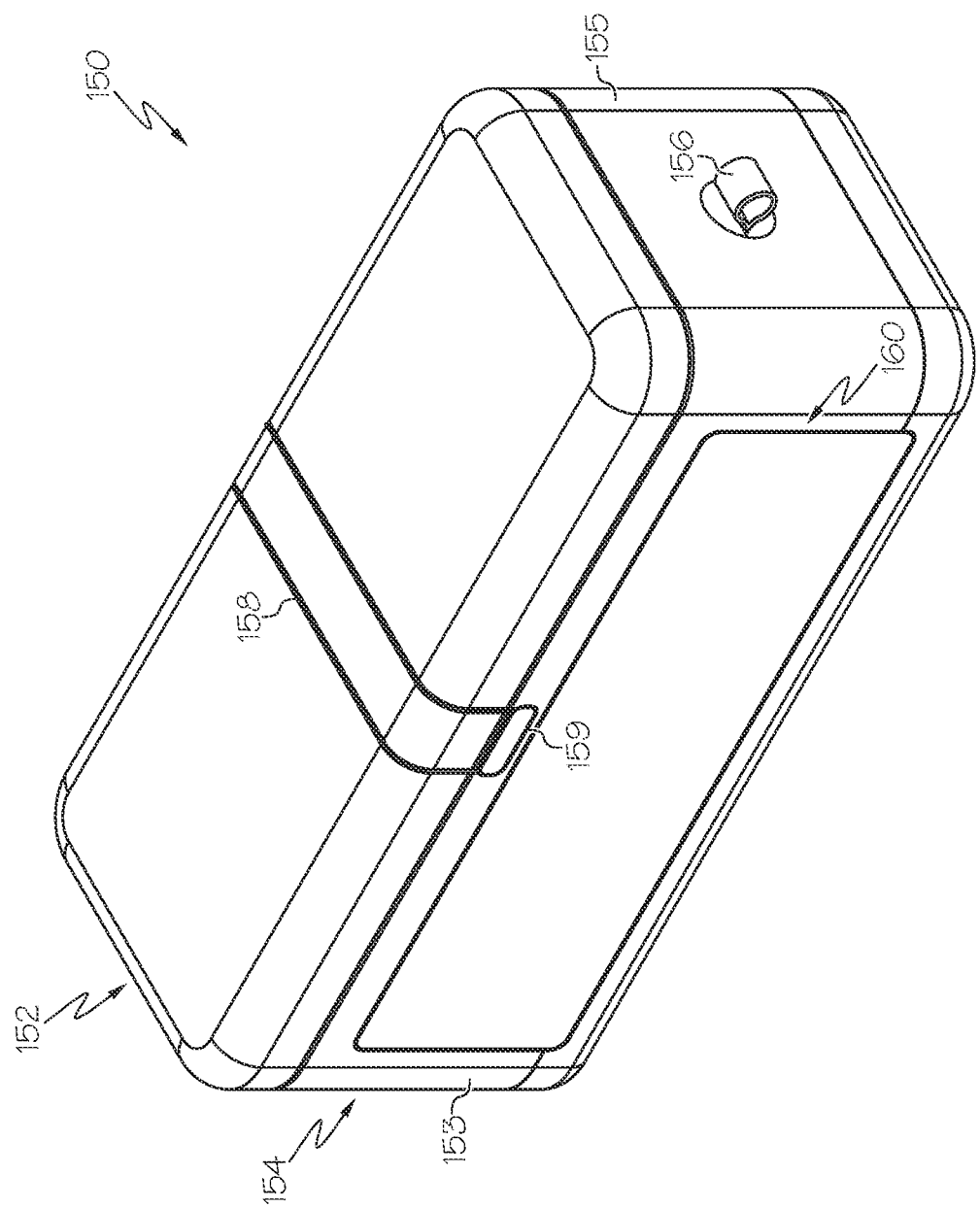
FIG. 7 shows a perspective view of a solar-powered charging case of the portable solar-powered lighting assembly, in accordance with some aspects of the present disclosure.
Figure 8:
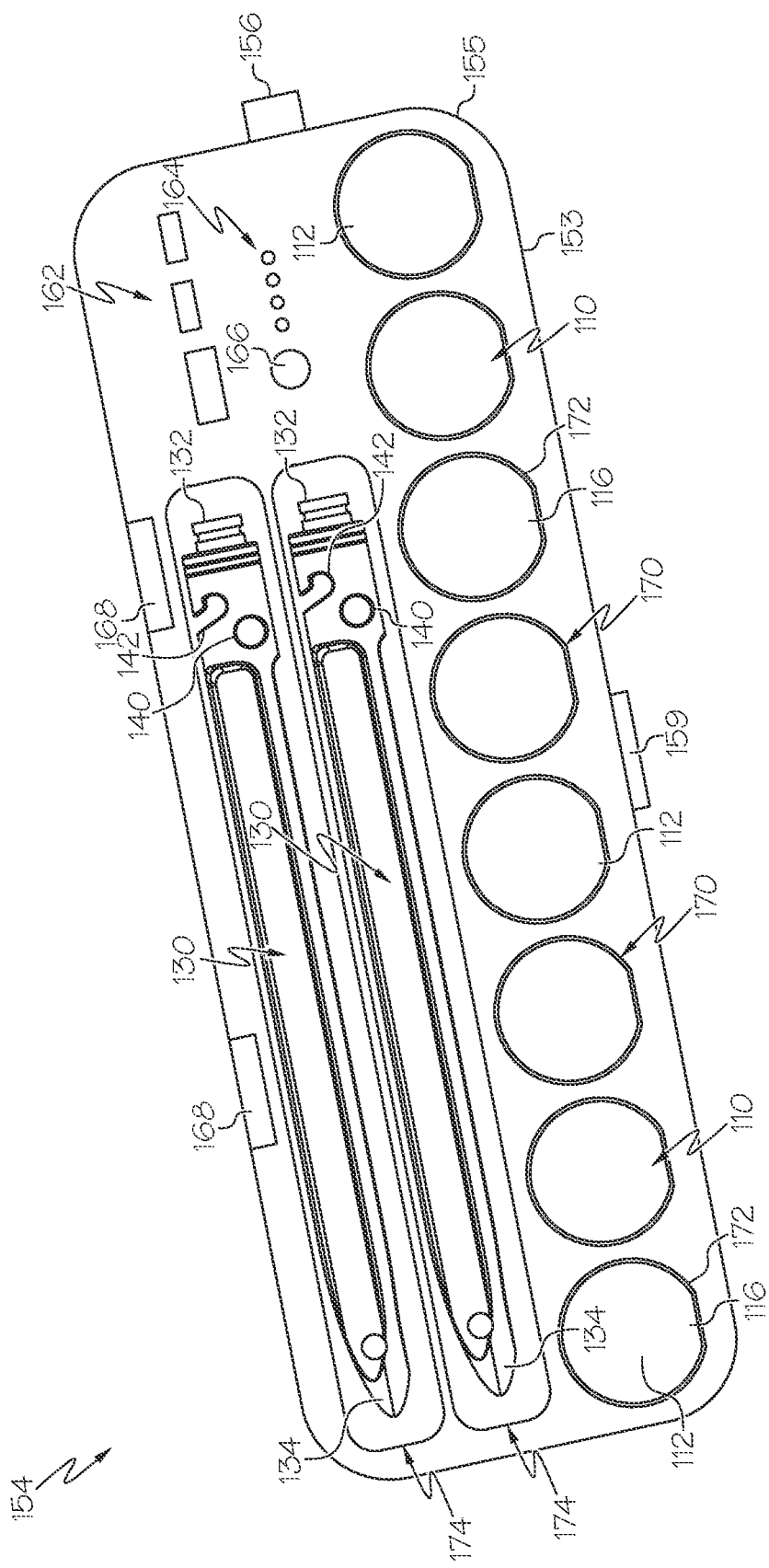
FIG. 8 shows a partial top view of the charging case of FIG. 7, in accordance with some aspects of the present disclosure.

As seen in FIG. 3, the planar interface 116 may extend substantially along a length of the housing 112, and the planar interface 116 may be configured to facilitate ease in holding and/or orientating the lighting device 110 during use. As described further herein, the planar interface 116 may be further configured to facilitate a receipt and connection of the lighting device 110 to one or more other components of the solar-powered lighting assembly 100, such as the solar-powered charging case 150 (FIGS. 7-8). The lighting device 110 may include an engagement interface 115 positioned along a distal (bottom) end of handle 114. The engagement interface 115 may include various suitable devices for coupling the lighting device 110 to the fastening device 130, such as, for example, a magnet, a threaded opening, a clip, a hook, a screw, and/or various other suitable engagement mechanisms.

Figure 5:
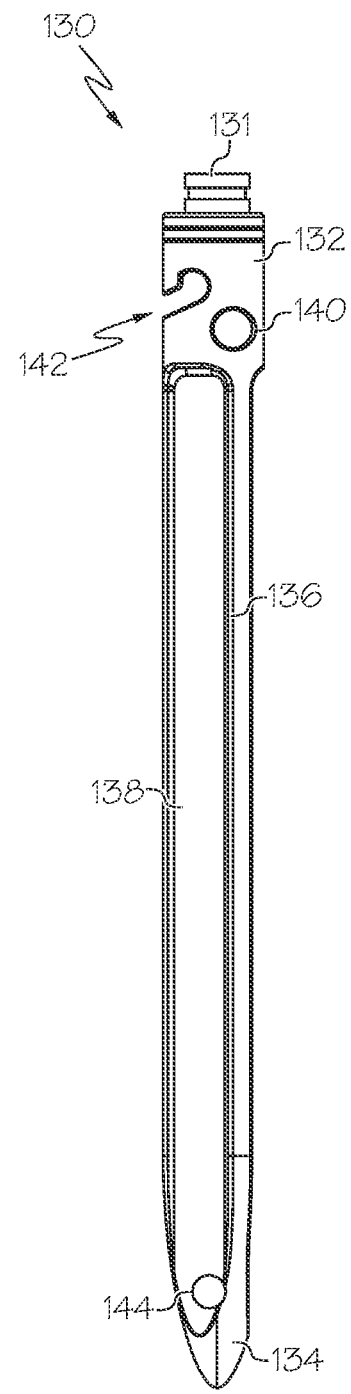
FIG. 5 shows a side view of a fastening device of the portable solar-powered lighting assembly of FIG. 1, in accordance with some aspects of the present disclosure.

The engagement interface 115 may be configured to engage the corresponding engagement interface 131 of the fastening device 130 (see FIG. 5). The engagement interface 131 may include a magnet, a threaded shaft that is complimentary to the threaded opening of the engagement interface 115, a movable tab, a pin, a clip, a hook, or other engagement mechanism suitable for coupling with the engagement interface 115. Thus, the engagement interface 115 and the engagement interface 131 may allow for the selective assembly of the lighting device 110 and the fastening device 130.

Figure 4:
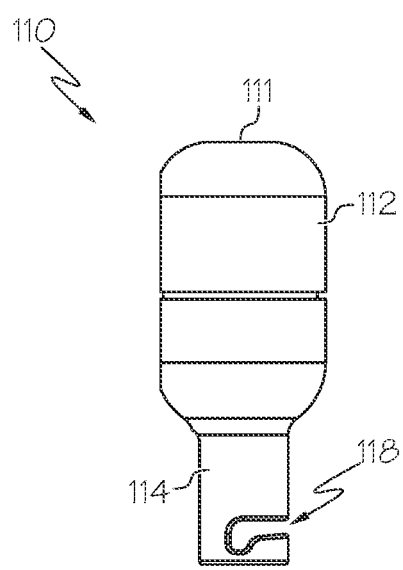
FIG. 4 shows a rear view of the lighting device of FIG. 3, in accordance with some aspects of the present disclosure.

As seen in FIGS. 3-4, the lighting device 110 may be disengaged from, and configured to operate independently of, the fastening device 130. Accordingly, the lighting device 110 may be selectively detached from the fastening device 130 and used in isolation from the fastening device 130. For example, the handle 114 of the lighting device 110 may be positioned on a surface, manually held and manipulated by a user, and/or attached to an object, such as by receiving a tool through the fastening element 118. With the actuator 120 positioned on the handle 114, the lighting device 110 may be configured to operate the LED of the lighting device 110 when in the disassembled state shown in FIG. 3-4.

Figure 6:
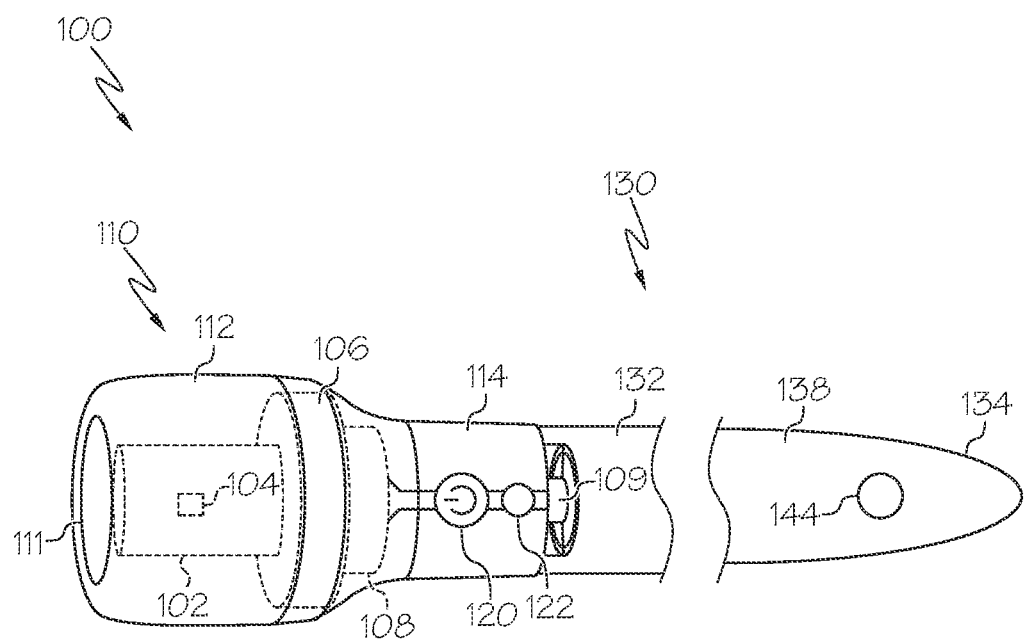
FIG. 6 shows a partial perspective view the portable solar-powered lighting assembly of FIG. 1, in accordance with some aspects of the present disclosure.

As best seen in FIG. 6, the lighting device 110 may include a top surface 111. The top surface 111 may have various suitable sizes, shapes, and/or configurations. For example, the top surface 111 may be planar, curved (e.g., convex or concave), and more. The top surface 111 may be configured to facilitate grasping the lighting device 110 along the housing 112. In other embodiments, the top surface 111 may be at least partially transparent and/or translucent to facilitate an emission of light from the housing 112. In some embodiments, a transparency and/or translucence along the top surface 111 may vary relative to the transparency and/or translucence of a remaining portion of the housing 112. For example, the top surface 111 may be configured to have a greater transparency such that a greater intensity of light may be emitted from the top surface 111 relative to the remainder of the housing 112, thereby providing a focused beam of light from the lighting device 110.

Still referring to FIG. 6, the lighting device 110 may include a microprocessor 102, one or more light sources (e.g., a light-emitting diode (LEDs)) 104, and a rechargeable battery 108 disposed within the housing 112. The LEDs 104 may be electrically connected to the microprocessor 102, and the microprocessor 102 may be electrically connected to the rechargeable battery 108. The lighting device 110 may further include a heat diffuser assembly 106 disposed inside of the housing 112. The heat diffuser assembly 106 may be positioned between the microprocessor 102 and the rechargeable battery 108, and may be configured to reduce and/or evenly distribute heat generated by the one or more internal components of the lighting device 110 (e.g., the microprocessor 102, the LED 104, the rechargeable battery 108, etc.) from overheating the other internal components of the lighting device 110 during use.

The rechargeable battery 108 may include a ferric or lithium ion battery. In some examples, the rechargeable battery 108 may have a capacity ranging from about 100 mAh to about 3500 mAh, e.g., about 1500 mAh to about 3500 mAh, about 2000 mAh to about 3000 mAh, or about 3000 mAh to about 3500 mAh, e.g., about 200 mAh, about 250 mAh, about 300 mAh, about 350 mAh, about 400 mAh, about 450 mAh, about 500 mAh, about 550 mAh, about 600 mAh, about 1000 mAh, about 1500 mAh, about 2000 mAh, about 2500 mAh or about 3000 mAh. According to some examples herein, the capacity of the rechargeable battery 108 may be sufficient to sustain a runtime of at least 6 hours, at least 12 hours, or at least 18 hours or more. In at least one example, the rechargeable battery has a capacity of 500 mAh and a runtime of about 12-16 hours on lumens.

Still referring to FIG. 6, the rechargeable battery 108 may be electrically connected to an electrical connector 109 of the lighting device 110. The electrical connector 109 may be disposed within and positioned along a bottom end of the handle 114. In some embodiments, the electrical connector 109 may be disposed within the engagement interface 115 (see FIG. 3). In other embodiments, the electrical connector 109 may be positioned along an exterior of the handle 114. The electronic connector 109 may include a universal serial bus (USB) connector that is configured to couple an external electronic device (e.g., a charger, a smartphone, or other mobile device) to the lighting device 110, such as, for example, via a cable. For example, the electronic connector 109 may include a USB port or USB-type port (including, e.g., micro-USB port).

The electronic connector 109 may be configured to allow for charging and/or powering of the lighting device 110 from a battery of the external electronic device coupled thereto. In other embodiments, the electronic connector 109 may be configured to charge the battery of the external electronic device coupled to the lighting device 110, such as via a power stored in the rechargeable battery 108. As described in further detail herein, the lighting device 110 may be configured to receive and store power in the rechargeable battery 108 from the solar-powered charging case 150 (see FIGS. 7-8), and particularly using current generated by a solar panel of the solar-powered charging case 150 when the lighting device 110 is coupled thereto.

Referring now to FIG. 7, an exemplary solar-powered charging case 150 of the solar-powered lighting assembly 100 is shown. The charging case 150 may be configured to receive, store, and/or charge a plurality of lighting devices 110 and a plurality of fastening devices 130. The charging case 150 may include a top cover 152 and a bottom base 154 that may be selectively coupled to one another. The bottom base 154 may include at least a front wall 153 and a pair of sidewalls 155. In some embodiments, the charging case 150 may be formed of a material that is water-resistant and/or waterproof, such as, for example, acrylonitrile butadiene styrene (ABS), polypropylene, polyethylene, silicone, polyurethane, including thermoplastic polyurethane (TPU), polyvinylchloride (PVC), or a combination thereof.

At least one of the walls of the bottom base 154, such as the front wall 153, may include a solar panel 160. The solar panel 160 may be coupled to or integrated into an outer surface of the bottom base 154 so as to allow for exposure to natural and/or artificial light. The solar panel 160 may comprise silicon, e.g., monocrystalline or polycrystalline silicon. In some embodiments, the solar panel 160 may fit within a recessed area (e.g., within a recessed area or aperture on the front wall 153), such that the solar panel 160 is substantially flush with the surrounding surface of the front wall 153.

In the example, the solar panel 160 may extend along a substantial length of the front wall 153, and may have a generally rectangular shape. It should be appreciated that solar panel 160 may be positioned along various other surfaces and/or walls of the bottom base 154, and may have other suitable sizes and/or shapes than those shown and described herein, without departing from a scope of this disclosure. In other embodiments, the top cover 152 may include one or more solar panels. The solar panel 160 may be backed by a support material, such as polycarbonate or another plastic or polymer. Alternatively, the solar panel 160 may be in direct contact with the material(s) of the bottom base 154. The surface of the solar panel 160 may include a protective film or resin to protect against damage and/or exposure to contaminants.

Still referring to FIG. 7, the solar panel 160 may be operably coupled to, that is, in electronic communication with, one or more electronic components within the bottom base 154, such as a rechargeable battery (not shown) of the charging case 150. Accordingly, the solar panel 160 may be electrically coupled to, and configured to recharge, the rechargeable battery of the charging case 150. In some examples, the solar panel 160 may charge the rechargeable battery in less than 24 hours, less than 18 hours, less than 12 hours, or less than 6 hours, such as from about 2 hours to about 15 hours, or from about 6 hours to about 12 hours.

The rechargeable battery of the charging case 150 may be electrically coupled to the rechargeable batteries 108 of the lighting devices 110 coupled to charging case 150, such that the charging case 150 may be operable to charge the rechargeable batteries 108 of the lighting devices 110 using the solar power collected by the solar panel 160 and stored in the rechargeable battery. In some embodiments, upon coupling an external electronic device to the charging case 150, such as via at least one of the electronic connectors 162 (see FIG. 8) of the charging case 150, the rechargeable battery may be operable to charge the external electronic device via the solar power collected by the solar panel 160 of the charging case 150.

In some embodiments, the bottom base 154 may include a handle 156 coupled to at least one of the walls, such as the sidewall 155, for facilitating movement of the charging case 150. Top cover 152 may include a locking mechanism 158, and the top cover 152 may be coupled to bottom base 154 via the locking mechanism 158. The locking mechanism 158 may be configured to selectively secure the top cover 152 to the bottom base 154, thereby concealing the internal components and stored contents (e.g., the lighting devices 110, the fastening devices 130) of the bottom base 154. In some embodiments, the locking mechanism 158 may include a strap, a cable, a wire, a band, a rope, a cord, and/or various other suitable devices for coupling the top cover 152 to the bottom base 154. The bottom base 154 may include a corresponding locking mechanism 159 that is configured to mate with the locking mechanism 158 of the top cover 152. In the example, the locking mechanism 159 may include a tab, a hook, an opening, a clip, and/or various other suitable features for engaging the locking mechanism 158.

Still referring to FIG. 7, the locking mechanism 158 may include an elastic strap secured to an exterior surface of the top cover 152, and the locking mechanism 159 may include a clip positioned along an exterior surface of the bottom base 154, such as on the front wall 153. The locking mechanism 158 may extend over a top surface of the top cover 152 to engage the locking mechanism 159 to securely attach the top cover 152 onto a top of the bottom base 154. The locking mechanism 158 may be selectively disengaged from the locking mechanism 159 to decouple the top cover 152 from the bottom base 154, thereby allowing removal of the top cover to facilitate access to the components and stored contents of the bottom base 154 (see FIG. 8).

FIG. 8 shows a top view of the bottom base 154 with the top cover 152 removed. The bottom base 154 may include a plurality of slots, recesses, cavities, and/or ports for receiving one or more components of a plurality of solar-powered lighting assemblies 100 (e.g., the lighting device 110 and the fastening device 130). For example, the bottom base 154 may include one or more first slots 170 and one or more second slots 174. In the example, the bottom base 154 may include eight first slots 170 and two second slots 174 for receiving eight solar-powered lighting assemblies 100 within the charging case 150. In other examples, the bottom base 154 may include additional and/or fewer first slots 170 and/or second slots 174 for storing a corresponding number of solar-powered lighting assemblies 100 without departing from a scope of this disclosure.

Each first slot 170 of the one or more first slots 170 may be sized, shaped, and/or otherwise configured to receive and hold at least one lighting device 110. In some embodiments, each of the first slots 170 may be at least partially defined by a planar wall 172 that corresponds to the planar interface 116 of the housing 112. Accordingly, the first slots 170 may be configured to guide and orient the lighting devices 110 received therein by inhibiting receipt of the lighting device 110 within the first slots 170 until the planar interface 116 is aligned with the planar wall 172. Stated differently, to ensure the lighting devices 110 are received within the first slots 170 in prearranged orientation, the first slots 170 may define an irregular cross-sectional profile that correspond to the cross-sectional profile of the housing 112, such that the planar interface 116 may be aligned with the planar wall 172 in order to receive the lighting device 110 in the first slot 170. In some embodiments, the charging case 150 may be configured to charge the lighting devices 110 stored therein only when the lighting devices 110 are received within the first slots 170 in the prearranged orientation.

Still referring to FIG. 8, in some embodiments the one or more first slots 170 may include a magnet that is configured to mate with the corresponding engagement interface 115 (e.g., a magnet) of the lighting devices 110, thereby coupling the lighting devices 110 within the first slots 170. In addition to planar wall 172, the first slots 170 may be configured to orient and align the lighting devices 110 received in the charging case 150 via a magnetic engagement between the complimentary magnets when the lighting device 110 is positioned in the first slot 170. In this instance, the charging case 150 may generate a tactile feedback upon the magnet in the first slot 170 magnetically coupling with the magnet of the lighting device 110.

The charging case 150 may be configured to power and charge each of the lighting devices 110 received inside each of the first slots 170, such as via a wired or wireless charging, using the rechargeable battery of the charging case 150. The rechargeable battery may have a capacity ranging from about 3000 mAH to about 5000 mAH, such as about 4000 mAh. According to some examples herein, the capacity of the rechargeable battery may be sufficient to sustain a runtime of at least 1 hour, at least 2 hours, or at least 3 hours or more. In at least one example, the rechargeable battery has a capacity of 4000 mAh and a runtime of about 1-2 hours on 12-15 lumens.

In some embodiments, the charging case 150 may be configured to transfer power to the lighting devices 110 through the electrical connector 109 of the lighting device 110. For example, the charging case 150 may include a corresponding electrical connector disposed within each of the first slots 170, such as, for example, a USB connection, electrical contacts, metal pins, and/or other electrical connection devices for electrically coupling the lighting devices 110 to the charging case 150. In other embodiments, the charging case 150 may be configured to wirelessly diffuse the solar power (generated by the solar panel 160) to the lighting devices 110 through each of the first slots 170 via various wireless power transfer mechanisms, such as, for example, through electromagnetic inductive charging via one or more induction coils disposed therein. Accordingly, the charging case 150 may be configured to charge (e.g., wirelessly or wired) the plurality of lighting devices 110 received within the plurality of first slots 170 with the solar power generated by the solar panel 160 and stored in the rechargeable battery of the charging case 150.

Still referring to FIG. 8, the second slots 174 of the bottom base 154 may be configured to receive and hold one or more of the fastening devices 130. In the example, each of the second slots 174 may be configured to receive and hold a plurality of fastening devices 130 therein, such as, for example, four fastening devices 130. The bottom base 154 may further include one or more electrical connectors 162. The electrical connectors 162 may include a universal serial bus (USB) connector that is configured to couple the charging case 150 to an external electronic device (e.g., a smartphone or other mobile device), such as, for example, via a cable. The electronic connectors 162 may include, but are not limited to, a USB port, a USB C port, a micro-USB port, and more. The charging case 150 may be configured to provide multidirectional charging such that the rechargeable battery of the charging case 150 may charge an external electronic device coupled thereto via the electrical connectors 162, and may receive electrical charge from the external electronic devices coupled to the electronic connectors 162.

The bottom base 154 may further include an interface display 164 and one or more actuators 166. The interface display 164 may be configured to display a current operating mode of the charging case 150 (e.g., on, off) and/or a current amount of power or charge remaining in the rechargeable battery of the charging case 150. In the example, the interface display 122 may include one or more LEDs that may be configured to illuminate and/or display different colors based on an operating mode or power level of the charging case 150. In other examples, the interface display 122 may include a display screen (e.g., a LCD screen) and/or other suitable display devices.

Still referring to FIG. 8, the actuator 166 may include a depressible button, a touchscreen display, a switch, a dial, and/or various other suitable input interfaces. In the example, the actuator 166 may include a power button that is operable to transfer electrical power stored in the rechargeable battery of the charging case 150 to the lighting devices 110 electrically coupled to the first slots 170. In the example, the charging case 150 may include one actuator 166 that may be selectively actuated by a user to power the lighting devices 110. Additionally, the actuator 166 may be selectively actuated to charge one or more external electronic devices electrically coupled to the electrical connectors 162, to change between different operating modes, and/or to check the amount of power or charge remaining in the rechargeable battery of the charging case 150 and/or the rechargeable batteries 108 of the lighting devices 110.

The bottom base 154 may include one or more recess 168 for receiving a corresponding engagement feature of the top cover 152 to facilitate connection between the top cover 152 and the bottom base 154. For example, the one or more recess 168 may accommodate a hinge, a clip, and/or other various fasteners of the top cover 152 suitable for selectively attaching and detaching from the bottom base 154. In some examples, the bottom base 154 may be configured to form a snap fit connection with the top cover 152 along the recesses 168.

In exemplary use of the solar-powered lighting assembly 100, a plurality of the lighting devices 110 and fastening devices 130 may be stored in the charging case 150 when not in use. The lighting devices 110 and fastening devices 130 may be moved together, and the lighting devices 110 may be charged using solar power collected by the solar panel 160, while maintained within the charging case 150. Upon decoupling the top cover 152 from the bottom base 154, a user may access the internal contents of the charging case 150 to retrieve one or more of the plurality of lighting devices 110 and/or fastening devices 130.

In one example, a user may utilize the lighting devices 110 independent of the fastening devices 130. In this instance, the lighting devices 110 (in the disassembled state from the fastening devices 130) may be manually grasped along the housing 112 and/or the handle 114 for control. In some embodiments, the lighting devices 110 may be water-resistant and/or waterproof, and configured to float and/or be submerged in a fluid, such that the lighting devices 110 may be utilized in or under water. In other instances, the lighting devices 110 may be suspended from a tool (e.g., a cord, a wire, a rope, etc.) by passing the tool through the fastening element 118 (see FIG. 4). Accordingly, with the tool secured above a ground surface, the lighting devices 110 may be maintained in a suspended state and hanging over the ground surface.

In another example, a user may utilize the lighting devices 110 with the fastening devices 130. In this instance, the lighting devices 110 may be coupled to the fastening devices 130 along the respective engagement interfaces 115 of the lighting devices 110 and the corresponding engagement interfaces 131 of the fastening devices 130. In some embodiments, the fastening devices 130 may float and/or be submerged in a fluid, such that the lighting devices 110 and the fastening devices 130 may both be utilized in or under water. The lighting device 110 may be secured to a surface and/or object via the fastening device 130. For example, the fastening devices 130 may be configured to secure the lighting device 110 to a ground surface by inserting the distal tip 134 through the ground surface, and thereby suspending the lighting device 110 over the ground.

In other instances, the lighting device 110 and the fastening device 130 may be suspended from a tool (e.g., a cord, a wire, a rope, etc.) by passing the tool through one or more of the fastening elements 118, 140, 142, 144 (see FIGS. 4-5).

Accordingly, with the tool secured above a ground surface, the lighting device 110 and the fastening device 130 may be maintained in a suspended state and hanging over the ground surface.

It is intended that the specification and examples be considered as exemplary only, with a true scope and spirit of the present disclosure being indicated by the following claims.

What is claimed is:

1. A portable solar-powered lighting assembly, comprising:
    a lighting device including a light source, a rechargeable battery, and a first engagement interface, the light source is electrically connected to the rechargeable battery; and
    a fastening device including a distal tip, a fastening element, and a second engagement interface, the fastening device is configured to selectively couple with the lighting device in response to the second engagement interface mating with the first engagement interface;
    wherein the lighting device includes a handle and a housing, and the light source includes one or more light-emitting diodes (LEDs) disposed within the housing;
    wherein the housing is at least partially transparent such that the one or more LEDs disposed within the housing are configured to emit light from the lighting device through the housing; and
    wherein the fastening device is configured to secure the lighting device to a surface in response to the fastening device penetrating the surface via the distal tip, and the fastening device is configured to secure the lighting device to a tool in response to the fastening device receiving the tool through the fastening element.

2. The portable solar-powered lighting assembly of claim 1, wherein the first engagement interface includes a first magnet, and the second engagement interface includes a second magnet that is configured to mate with the first magnet.

3. The portable solar-powered lighting assembly of claim 1, wherein the first engagement interface includes a threaded opening, and the second engagement interface includes a threaded shaft that is configured to mate with the threaded opening.

4. The portable solar-powered lighting assembly of claim 1, wherein the handle includes at least one actuator configured to actuate the lighting device to emit light from the light source using current stored in the rechargeable battery.

5. The portable solar-powered lighting assembly of claim 1, wherein the lighting device includes a universal serial bus (USB) connector that is configured to couple an external electronic device to the rechargeable battery to transfer power from the rechargeable battery to the external electronic device using current generated stored in the rechargeable battery.

6. The portable solar-powered lighting assembly of claim 1, wherein the fastening element includes an enclosed aperture formed on the fastening device, and the tool includes a cord extending through the enclosed aperture.

7. The portable solar-powered lighting assembly of claim 6, wherein the fastening device is configured to secure the lighting device to the cord in response to the fastening device receiving the cord through the enclosed aperture, such that the lighting device is suspended on the cord.

8. The portable solar-powered lighting assembly of claim 1, wherein the fastening device includes a second fastening element defining a hook formed on the fastening device, the fastening device is configured to secure the lighting device to the tool in response to the fastening device receiving the tool through the second fastening element.

9. The portable solar-powered lighting assembly of claim 1, wherein the lighting device includes at least one fastening element, the lighting device is configured to couple the tool in response to the lighting device receiving the tool through the at least one fastening element of the lighting device.

10. The portable solar-powered lighting assembly of claim 1, further including a charging case that is configured to receive the lighting device and the fastening device, the charging case including:
    a rechargeable battery; and
    a solar panel positioned along an exterior of the charging case, the solar panel being electrically connected to the rechargeable battery and configured to generate electrical power for storing in the rechargeable battery.

11. The portable solar-powered lighting assembly of claim 10, wherein the charging case includes a plurality of first slots configured to receive a plurality of lighting devices, and a plurality of second slots configured to receive a plurality of fastening devices.

12. The portable solar-powered lighting assembly of claim 11, wherein each of the plurality of first slots includes a third engagement interface that is configured to mate with the first engagement interface, thereby coupling the plurality of lighting devices to the plurality of first slots.

13. The portable solar-powered lighting assembly of claim 12, wherein the first engagement interface includes a first magnet, and the third engagement interface includes a second magnet that is configured to mate with the first magnet.

14. The portable solar-powered lighting assembly of claim 11, wherein the charging case is configured to transfer the electrical power generated by the solar panel and stored in the rechargeable battery to the plurality of lighting devices in the plurality of first slots.

15. A portable solar-powered lighting assembly comprising:
    a lighting device including:
        a light source;
        a rechargeable battery electrically connected to the light source;
        a first fastening element configured to receive a tool; and
        a first engagement interface; and
    a fastening device including:
        a distal tip configured to insert the fastening device into a surface;
        a second fastening element configured to receive the tool; and
        a second engagement interface configured to mate with the first engagement interface to selectively couple the fastening device with the lighting device;
    wherein, with the lighting device coupled to the fastening device, the lighting device is configured to secure the fastening device to the tool in response to the first fastening element receiving the tool, and the fastening device is configured to secure the lighting device to the surface in response to the distal tip penetrating the surface, and to the tool in response to the second fastening element receiving the tool.

16. The portable solar-powered lighting assembly of claim 15, further including a charging case configured to receive the lighting device and the fastening device, the charging case including:

a rechargeable battery; and a solar panel positioned along an exterior of the charging case, the solar panel being electrically connected to the rechargeable battery and configured to generate electrical power for storing in the rechargeable battery.

17. The portable solar-powered lighting assembly of claim 16, wherein the charging case is configured to charge the lighting device with the electrical power generated by the solar panel and stored in the rechargeable battery.

18. A portable solar-powered lighting assembly comprising:

a plurality of lighting devices, each of the plurality of lighting devices including a light source, a rechargeable battery, and a first engagement interface, the light source is electrically connected to the rechargeable battery;

a plurality of fastening devices including a second engagement interface, each of the plurality of fastening devices is configured to selectively couple with at least one of the plurality of lighting devices in response to the second engagement interface mating with the first engagement interface; and a case including a plurality of first slots configured to receive the plurality of lighting devices, and a plurality of second slots configured to receive the plurality of fastening devices, each of the plurality of first slots includes a third engagement interface that is configured to mate with the first engagement interface, thereby coupling the plurality of lighting devices to the plurality of first slots;

wherein the case is configured to charge the plurality of lighting devices received within the plurality of first slots with solar power generated from a solar panel of the case.

* * * * *